US011816337B2

(12) United States Patent
Hahn et al.

(10) Patent No.: US 11,816,337 B2
(45) Date of Patent: Nov. 14, 2023

(54) ENTERPRISE HOST MEMORY BUFFER (71) Applicant: Western Digital Technologies, Inc., San Jose, CA (US)

(72) Inventors: Judah Gamliel Hahn, Ofra (IL); Avichay Haim Hodes, Kfar Ben-Nun (IL); Shay Benisty, Beer Sheva (IL); Michael James, Longmont, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/543,473

(22) Filed: Dec. 6, 2021

(65) Prior Publication Data
US 2023/0176744 A1 Jun. 8, 2023

(51) Int. Cl.
*G06F 3/06* (2006.01)
*G06F 13/16* (2006.01)
*G06F 13/42* (2006.01)
*G06F 13/40* (2006.01)

(52) U.S. Cl.
CPC .......... *G06F 3/0616* (2013.01); *G06F 3/0656* (2013.01); *G06F 3/0658* (2013.01); *G06F 3/0688* (2013.01); *G06F 13/1673* (2013.01); *G06F 13/4022* (2013.01); *G06F 13/4221* (2013.01); *G06F 2213/0026* (2013.01)

(58) Field of Classification Search
CPC .... G06F 3/0616; G06F 3/0656; G06F 3/0658; G06F 3/0688; G06F 13/1673; G06F 13/4022; G06F 13/4221; G06F 2213/0026
See application file for complete search history.

(56) References Cited

U.S. PATENT DOCUMENTS

| 8,074,021 B1* | 12/2011 | Miller ................. G06F 12/0246 711/170 |
| 2014/0047166 A1* | 2/2014 | Asnaashari ......... G06F 12/0246 711/103 |
| 2014/0129753 A1* | 5/2014 | Schuette ............ G06F 13/4068 710/301 |
| 2017/0060668 A1* | 3/2017 | Farhan ................ G06F 12/0871 |
| 2018/0121354 A1* | 5/2018 | Ishiyama ................ G06F 3/068 |
| 2019/0138220 A1 | 5/2019 | Hahn et al. |
| 2019/0227938 A1 | 7/2019 | Gopalakrishnan et al. |

(Continued)

OTHER PUBLICATIONS

K. Kim, E. Lee and T. Kim, "HMB-SSD: Framework for Efficient Exploiting of the Host Memory Buffer in the NVMe SSD," in IEEE Access, vol. 7, pp. 150403-150411, 2019, doi: 10.1109/ACCESS.2019.2947350. (Year: 2019).*

(Continued)

*Primary Examiner* — Eric T Oberly
(74) *Attorney, Agent, or Firm* — PATTERSON + SHERIDAN, LLP; Steven H. VerSteeg (57) ABSTRACT

A storage system includes one or more data storage devices, a PCIe switch coupled to the one or more data storage devices, and a controller unit coupled to the PCIe switch. The controller unit includes a dynamic random access memory (DRAM) host memory buffer (HMB) controller and a DRAM pool or a controller memory buffer (CMB) controller, a root complex/port, and the DRAM pool. The DRAM pool includes one or more DRAM devices. The one or more data storage devices are configured to interact with the controller unit and store data to a DRAM of the DRAM pool of the controller unit.

20 Claims, 6 Drawing Sheets (56) References Cited

U.S. PATENT DOCUMENTS

| | | | |
|---|---|---|---|
| 2020/0081648 A1* | 3/2020 | Bernat | G06F 11/076 |
| 2021/0049114 A1 | 2/2021 | Kim et al. | |
| 2021/0173571 A1* | 6/2021 | Lee | G06F 3/0604 |
| 2021/0257034 A1* | 8/2021 | Lee | G11C 16/3495 |
| 2022/0147449 A1* | 5/2022 | Zhao | G06F 3/0679 |

OTHER PUBLICATIONS

International Search Report and Written Opinion for International Application No. PCT/US2022/030407 dated Oct. 7, 2022.

* cited by examiner

ENTERPRISE HOST MEMORY BUFFER

BACKGROUND OF THE DISCLOSURE

Field of the Disclosure

Embodiments of the present disclosure generally relate to data storage devices, such as solid state drives (SSDs), and, more specifically, using external storage devices via an interface between the data storage device and a host device.

Description of the Related Art

Enterprise SSDs have specific requirements in order to integrate into data center environments. For example, requirements may include predictability and short latency for read operations and maintaining a same level of quality of service (QoS) for reads from any part of a logical address range of the SSD. Due to the requirements, logical block address (LBA) to physical block address (PBA) (L2P) tables may be stored in DRAM, where the DRAM capacity may be in a 1:1000 ratio (e.g., 2 TB SSD=2 GB DRAM for L2P table caching). In some examples, the ratio may be larger (e.g., 1:2000) at the expense of performance due to increased indirection. Thus, as SSD capacity increases, the capacity of the DRAM included in the SSD also increase, which may increase the cost of the SSD.

A data storage device for enterprise storage systems may be rated based on a number of drive writes per day (DWPD) for the lifetime of the drive. A customer may choose to exceed the DWPD of the data storage device at the expense of wearing out the device faster. Thus, the cost of the data storage device translates to a number of write cycles (e.g., program erase cycle (PEC)). Because DRAM does not wear out at the same speed as non-volatile memory, such as NAND memory, large capacity data storage devices may have uneven memory usage, such that the non-volatile memory may be retired from use before the DRAM is needed to be retired from use.

Therefore, there is a need in the art for an improved storage system for better integration into data center environments.

SUMMARY OF THE DISCLOSURE

The present disclosure generally relates to data storage devices, such as solid state drives (SSDs), and, more specifically, using external storage devices via an interface between the data storage device and a host device. A storage system includes one or more data storage devices, a PCIe switch coupled to the one or more data storage devices, and a controller unit coupled to the PCIe switch. The controller unit includes a dynamic random access memory (DRAM) host memory buffer (HMB) controller and a DRAM pool or a controller memory buffer (CMB) controller, a root complex/port, and the DRAM pool. The DRAM pool includes one or more DRAM devices. The one or more data storage devices are configured to interact with the controller unit and store data to a DRAM of the DRAM pool of the controller unit.

In one embodiment, a storage system includes one or more data storage devices, a PCIe switch coupled to the one or more data storage devices, and a controller unit coupled to the PCIe switch. The controller unit includes a dynamic random access memory (DRAM) host memory buffer (HMB) controller and a DRAM pool. The DRAM pool includes one or more DRAM devices.

In another embodiment, a storage system includes a first data storage device, a second data storage device, a PCIe switch coupled to the first data storage device and the second data storage device, and a controller unit coupled to the first data storage device and the second data storage device. The controller unit includes a dynamic random access memory (DRAM) host memory buffer (HMB) controller and a DRAM pool. The DRAM pool includes one or more DRAM devices.

In another embodiment, a storage system includes a first data storage device comprising a first memory means, a second data storage device comprising a second memory means, a PCIe switch coupled to the first data storage device and the second data storage device, and a controller unit coupled to the first data storage device and the second data storage device. The controller unit includes a controller memory buffer (CMB) controller and a root complex/port.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, using external storage devices via an interface between the data storage device and a host device. A storage system includes one or more data storage devices, a PCIe switch coupled to the one or more data storage devices, and a controller unit coupled to the PCIe switch. The controller unit includes a dynamic random access memory (DRAM) host memory buffer (HMB) controller and a DRAM pool or a controller memory buffer (CMB) controller, a root complex/port, and the DRAM pool. The DRAM pool includes one or more DRAM devices. The one or more data storage devices are configured to interact with the controller unit and store data to a DRAM of the DRAM pool of the controller unit.

Figure 1:
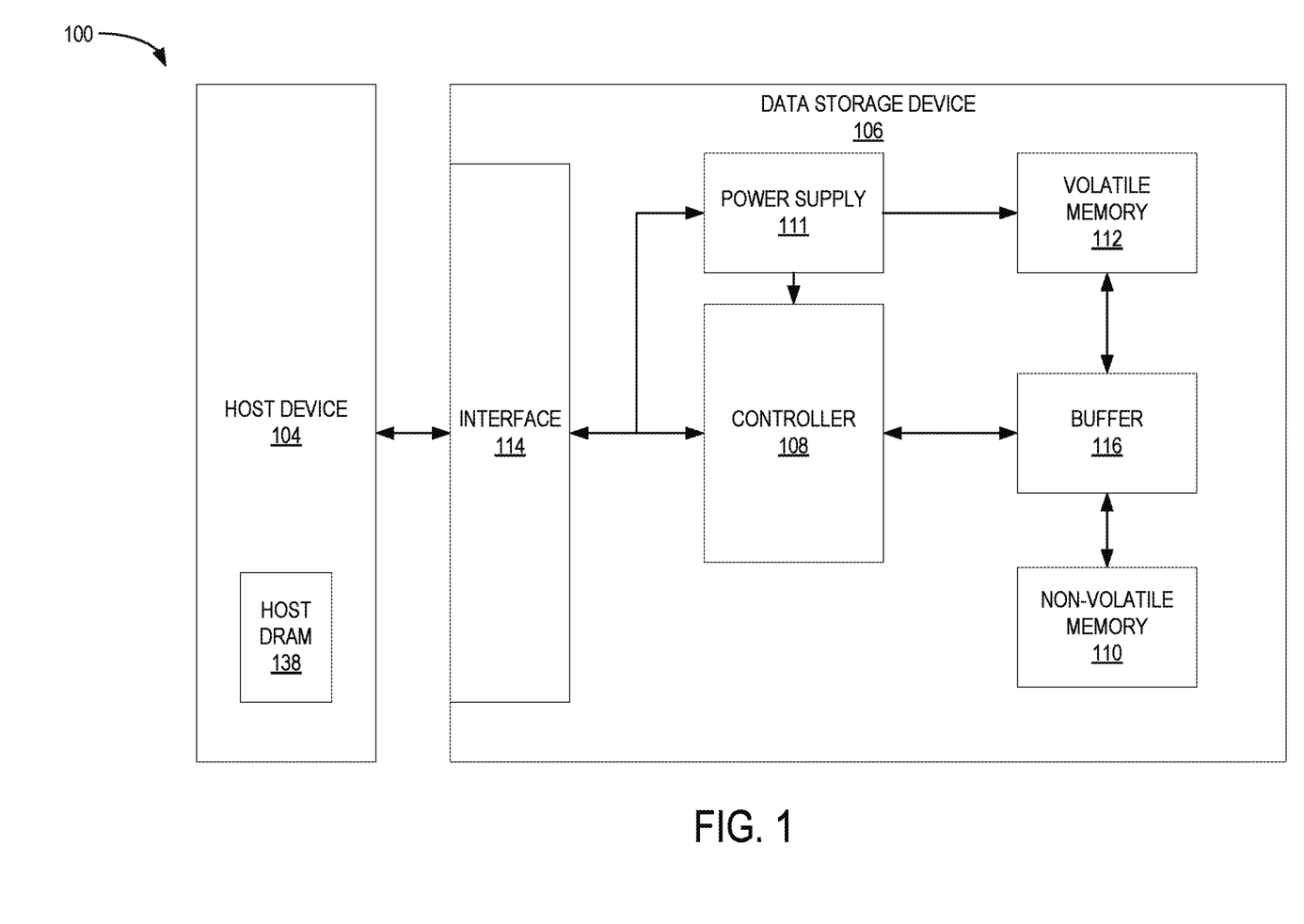
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: PCI, and PCIe, non-volatile memory express (NVMe), OpenCAPI, GenZ, Cache Coherent Interface Accelerator (CCIX), Open Channel SSD (OCSSD), or the like. It is to be understood that other protocols not listed may be applicable to the embodiments described herein. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
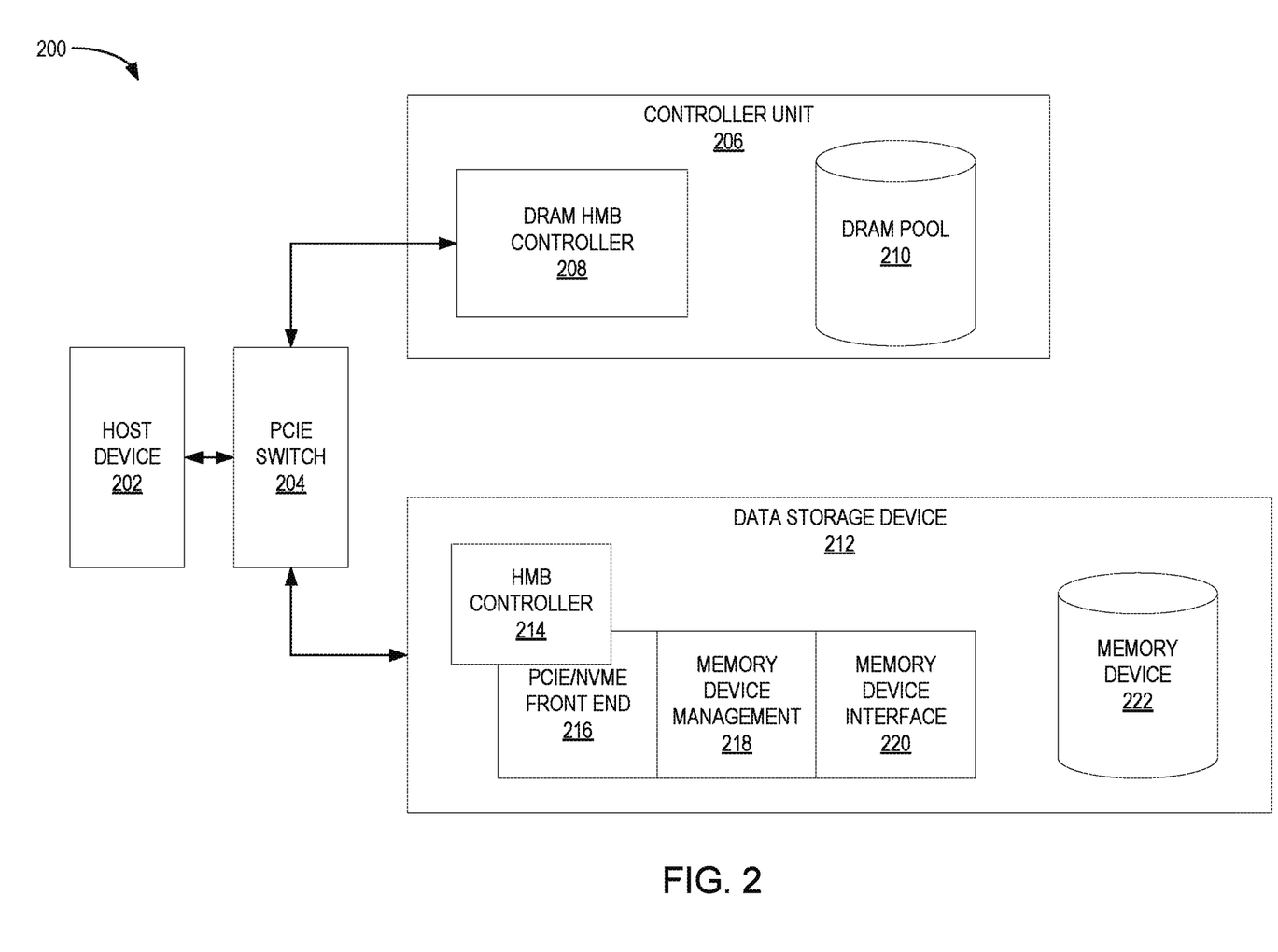
FIG. 2 is a schematic block diagram illustrating a storage system in which an external controller unit may function as a storage device for a data storage device, according to certain embodiments.

FIG. 2 is a schematic block diagram illustrating a storage system 200 in which a controller unit 206 may function as a storage device for a data storage device 212, according to certain embodiments. The data storage device 212 may be the data storage device 106 of FIG. 1. The storage system 200 includes a host device 202 coupled to a PCIe switch 204. The PCIe switch 204 is coupled to the controller unit 206 and the data storage device 212. The PCIe switch 204 may have more than one port, such that more than one data storage device may be connected to the PCIe switch 204.

The controller unit 206 includes a DRAM host memory buffer (HMB) controller 208 and a DRAM pool 210. In some examples, the DRAM pool 210 may resemble a HMB. The controller unit 206 may be a simplified version of the data storage device 212, where the controller unit 206 is distinct from the data storage device 212. The DRAM pool 210 includes one or more DRAM devices. In some embodiments, the DRAM pool 210 may be any pool of volatile memory devices.

In some examples, the controller unit 206 may further include an NVM device. In cases where power fail protection is needed, the controller unit 206 may flush data stored in the DRAM pool 210 to the NVM device. In other examples, the controller unit 206 may flush data stored in the DRAM pool 210 to the memory device 222 of the data storage device 212. The DRAM HMB controller 208 may be responsible for allocating one or more DRAM devices from the DRAM pool 210 to the data storage device 212 as well as writing data to and reading from the one or more DRAM devices of the DRAM pool 210.

The data storage device 212 includes a HMB controller 214, a PCIe/NVMe front end (FE) 216, a memory device management unit 218, a memory device interface unit 220, and a memory device 222, which may be a pool of memory devices. The memory device 222 may be an NVM device. When the host device 202 sends a write command to the data storage device 212, the PCIe/NVMe FE 216 receives the write command. The PCIe/NVMe FE 216 may process the write command, which may include generating and encoding error correction code for the data of the write command. The memory device management unit 218 may schedule write commands to program data to the memory device 222 and read commands to read data from the memory device 222. The memory device interface unit 220 may access the memory device 222 so that data may be programmed to or read from the memory device 222.

When data is programmed to the memory device 222, the LBA to PBA mapping of the data may be stored in a L2P table. The controller unit 206 may appear to the data storage device 212 as a peer PCIe device and may be addressed using standard PCIe methods. Thus, the HMB controller 214 may access the controller unit 206 as an external storage device in order to store and retrieve L2P descriptors. For example, the L2P table of the data storage device 212 may be stored in a DRAM device of the DRAM pool 210 rather than a DRAM device of the data storage device 212.

Figure 3:
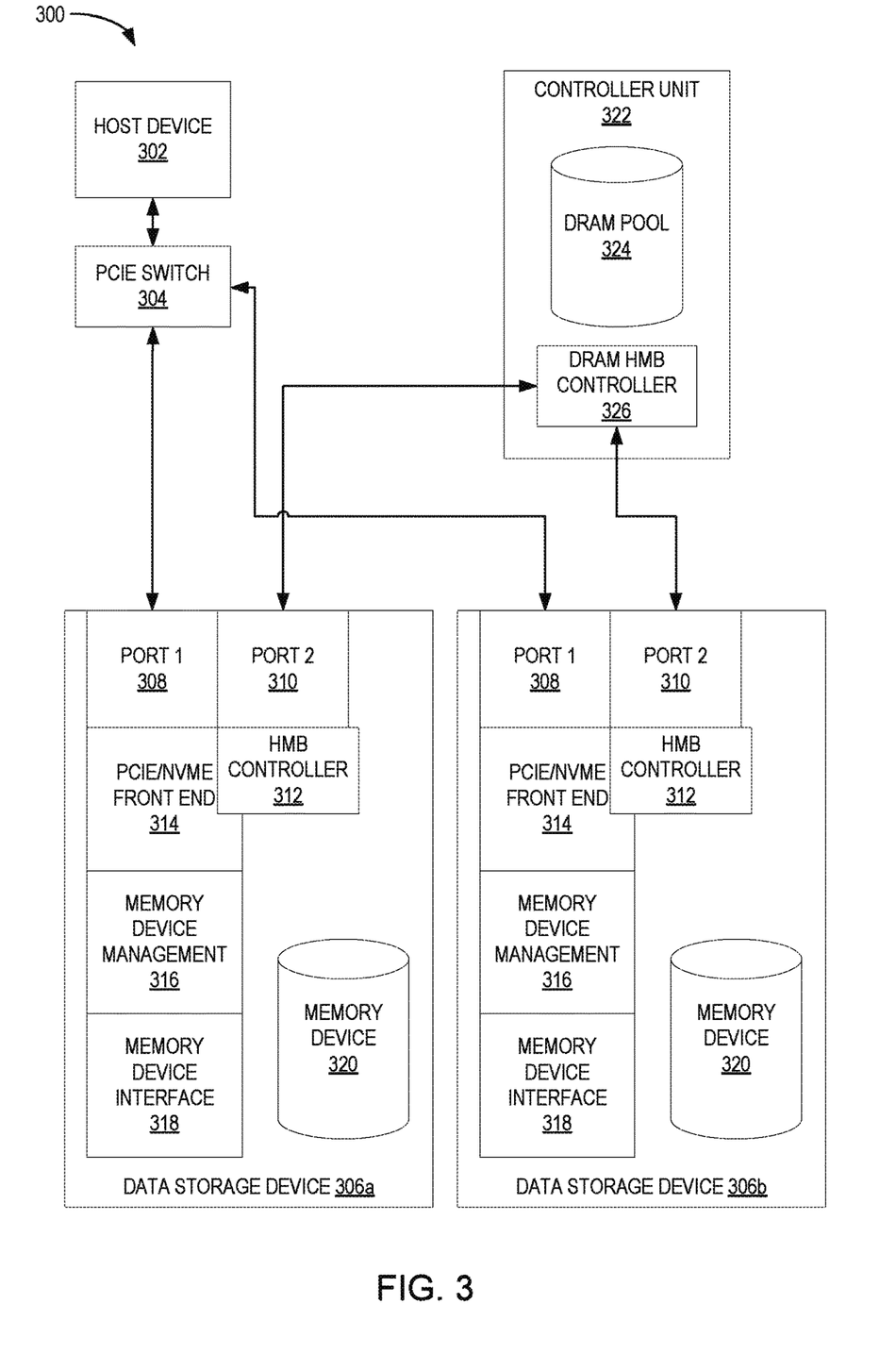
FIG. 3 is a schematic block diagram illustrating a storage system in which an external controller unit may function as a storage device for a first data storage device and a second data storage device, according to certain embodiments.

FIG. 3 is a schematic block diagram illustrating a storage system 300 in which a controller unit 322 may function as a storage device for a first data storage device 306a and a second data storage device 306b, according to certain embodiments. Aspects of the storage system 300 may be similar to the storage system 200 of FIG. 2. It is to be understood that one or more data storage devices may be coupled to the PCIe switch 304 and the controller unit 322.

A host device 302 is coupled to the PCIe switch 304. The first data storage device 306a and the second data storage device 306b each include a first port 308, a second port 310, a HMB controller 312, a PCIe/NVMe FE 314, a memory device management unit 316, a memory device interface unit 318, and a memory device 320, which may be a pool of memory devices. The memory device 222 may be an NVM device.

The controller unit 322 includes a DRAM HMB controller 326 and a DRAM pool 324. In some examples, the DRAM pool 324 may resemble a HMB. The controller unit 322 may be a simplified version of the first data storage device 306a and the second data storage device 306b. The DRAM pool 324 includes one or more DRAM devices. In some embodiments, the DRAM pool 324 may be any pool of volatile memory devices (e.g., SRAM, DRAM, or both). In some examples, the controller unit 322 may further include an NVM device.

The first port 308 may be coupled to the PCIe switch 304 for interaction with the host device 302. The second port 310 of the first data storage device 306a and the second data storage device 306b may be used for redundancy (in case the first port 308 fails) or in some embodiments, be connected to the DRAM HMB controller 326 of the controller unit 322. The DRAM HMB controller 326 may act as a root complex for one or more data storage devices. It is to be understood that the data storage devices may have more than two ports.

By using the DRAM pool 324 of the controller unit 322 as an external memory device, where the second port 310 is coupled to the controller unit 322, latency may be kept consistent as the second port may be used for read and write commands directed to the controller unit 322. Likewise, a PCIe-based prioritization in the PCIe switch 304 may be used to ensure that accesses to the DRAM pool 324 are prioritized higher than regular data throughput in order to ensure consistent read access to L2P entries stored in the DRAM pool 324.

In cases where power fail protection is needed, the controller unit 322 may flush data stored in the DRAM pool 324 to the NVM device. In other examples, the controller unit 206 may flush data stored in the DRAM pool 324 to the memory device 320 of either the first data storage device 306a, the second data storage device 306b, or both the first data storage device 306a and the second data storage device 306b. The DRAM HMB controller 326 may be responsible for allocating one or more DRAM devices from the DRAM pool 324 to the first data storage device 306a and the second data storage device 306b as well as writing data to and reading from the one or more DRAM devices of the DRAM pool 324.

Figure 4:
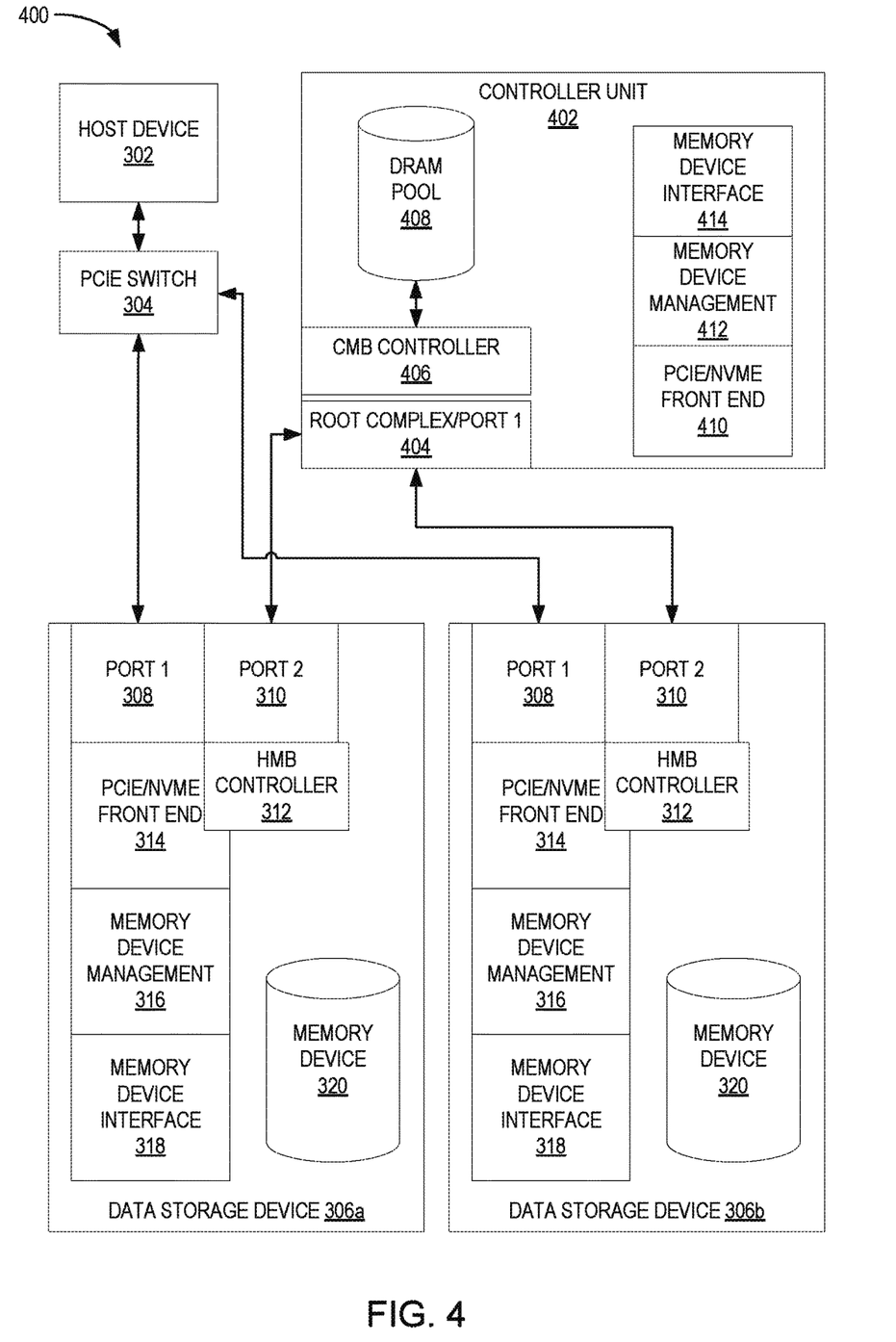
FIG. 4 is a schematic block diagram illustrating a storage system in which an external controller unit may function as a storage device for a first data storage device and a second data storage device, according to certain embodiments.

FIG. 4 is a schematic block diagram illustrating a storage system 400 in which a controller unit 402 may function as a storage device for a first data storage device 306a and a second data storage device 306b, according to certain embodiments. Aspects of the storage system 400 may be similar to the storage system 300 of FIG. 3. For simplification purposes, common elements between the storage system 400 and the storage system 300 may have identical or similar reference numerals.

Rather than using a HMB controller in the controller unit 402, the controller unit 402 uses a controller memory buffer (CMB) controller 406. The controller unit 402 includes a root complex/port 1 404, which may be able to connect to multiple data storage devices, the CMB controller 406 coupled to a DRAM pool 408, a PCIe/NVMe FE 410, a memory device management unit 412, and a memory device interface unit 414. In some examples, the controller unit 402 may be a data storage device that does not include an NVM device. In other examples, the controller unit 402 may be a data storage device that is reused as a shared DRAM interface. In some examples, the interconnect to the DRAM pool 408 uses a compute express link, which allows for cache-coherent access between multiple processing devices using PCIe as an interconnect. Thus, the controller unit 402 may be a CXL memory device.

Figure 5:
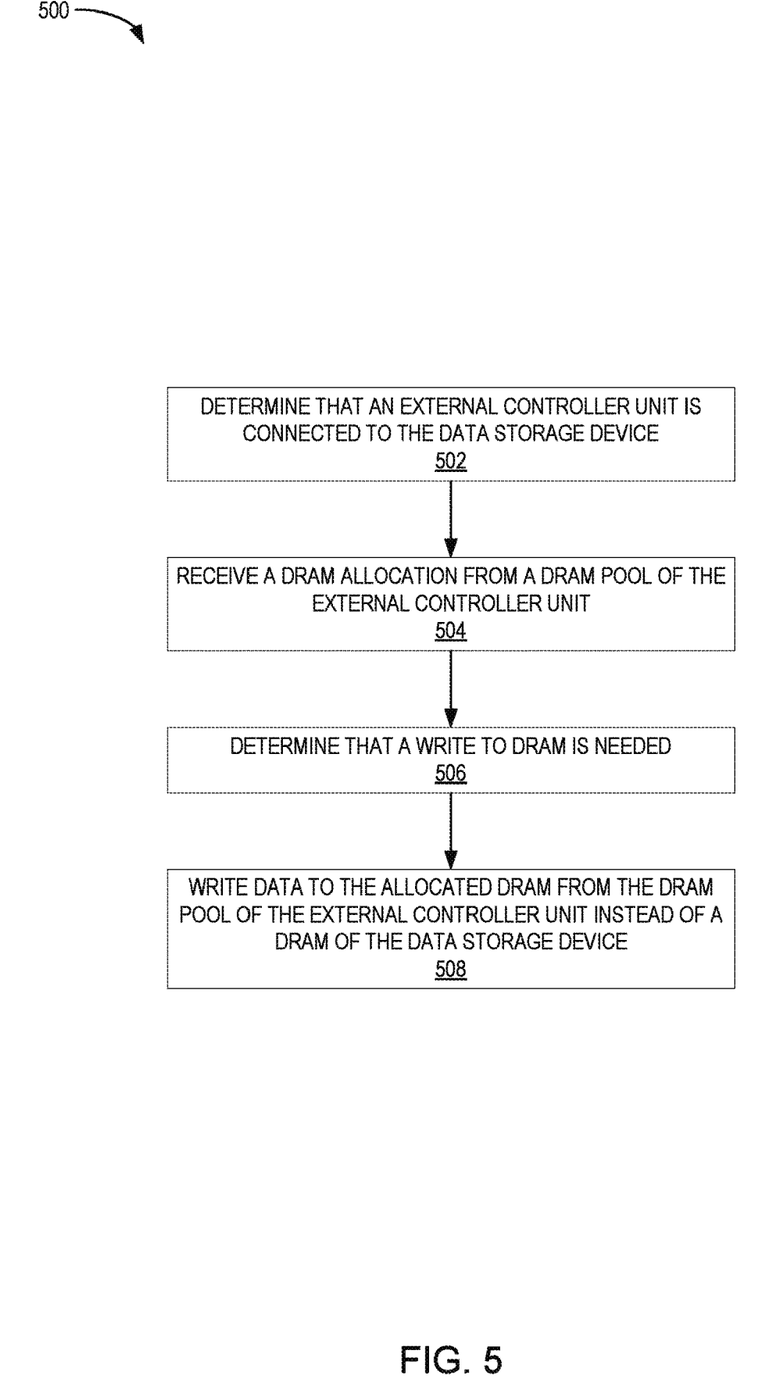
FIG. 5 is a flow diagram illustrating a method of storing data to an external controller unit, according to certain embodiments.

FIG. 5 is a flow diagram illustrating a method 500 of storing data to a controller unit, according to certain embodiments. Method 500 may be employed by any of the storage systems 200, 300, 400 described above. For exemplary purposes, aspects of the storage system 200 may be referenced. At block 502, a controller of the data storage device 212, such as the HMB controller 214, determines that an external controller unit, such as the controller unit 206, is connected to the data storage device 212. The connection may be a direct connection or an indirect connection.

At block 504, the HMB controller 214 receives a DRAM allocation from the DRAM pool 210. For example, the DRAM HMB controller 208 may allocate one or more DRAM devices from the DRAM pool 210 for use by the data storage device 212. At block 506, the HMB controller 214 determines that a write to a DRAM device is needed. The determination may be due to a write to the memory device 222, data management operations, such as garbage collection, to the memory device 222, or the like. Thus, because a mapping (LBA to PBA) may be changed, the corresponding L2P entry in the corresponding L2P table needs to be updated. At block 508, the HMB controller 214 sends a write command to the DRAM HMB controller 208 to write data to the allocated DRAM from the DRAM pool 210 instead of using a DRAM of the data storage device 212. Thus, the L2P table may be maintained externally, such as in a DRAM of the DRAM pool 210.

Figure 6:
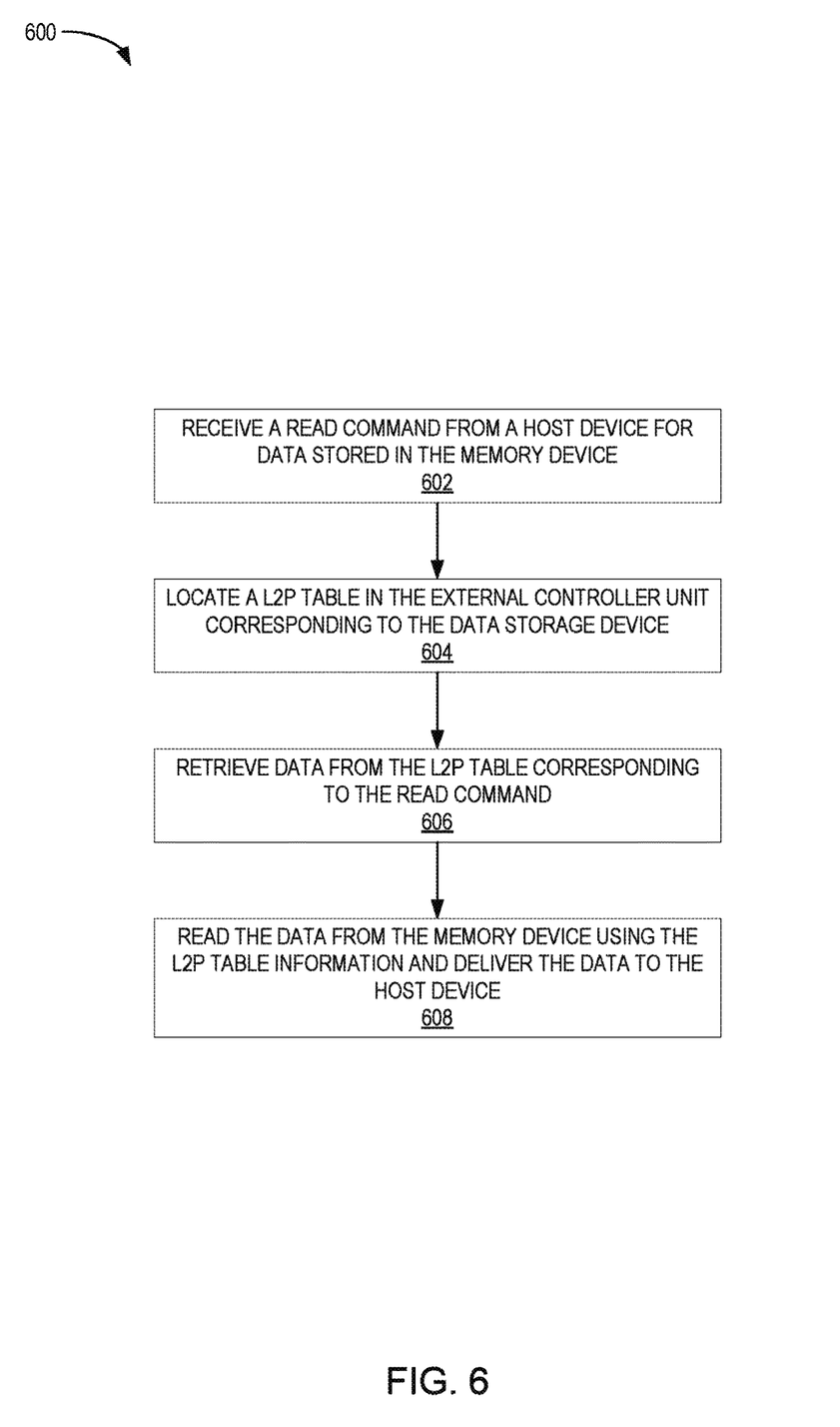
FIG. 6 is a flow diagram illustrating a method of reading data from an external controller unit, according to certain embodiments.

FIG. 6 is a flow diagram illustrating a method 600 of reading data from a controller unit, according to certain embodiments. Method 600 may be employed by any of the storage systems 200, 300, 400 described above. For exemplary purposes, aspects of the storage system 200 may be referenced. At block 602, a controller of the data storage device 212, such as the HMB controller 214, receives a read command from the host device 202 for data stored in the memory device 222.

At block 604, the HMB controller 214 locates a L2P table in the controller unit 206 corresponding to the data storage device 212. At block 606, the HMB controller 214 sends a read command to the DRAM HMB controller 208 to retrieve data from the L2P table corresponding to the read command. At block 608, the data is read from the memory device 222 using the retrieved L2P table information and the data is delivered to the host device 202.

By having a storage system that includes an external controller unit or storage device for use as a volatile memory pool for one or more data storage devices, the cost of the one or more data storage devices may be decreased due to a decreased volatile memory requirement of the one or more data storage devices.

In one embodiment, a storage system includes one or more data storage devices, a PCIe switch coupled to the one or more data storage devices, and a controller unit coupled to the PCIe switch. The controller unit includes a dynamic random access memory (DRAM) host memory buffer (HMB) controller and a DRAM pool. The DRAM pool includes one or more DRAM devices.

The PCIe switch is directly coupled to the DRAM HMB controller. Each data storage device of the one or more data storage devices includes a HMB controller, a PCIe/NVMe front end unit, a memory device management unit, a memory device interface unit, and a memory device. The controller unit acts as a root complex for the one or more data storage devices. The one or more data storage devices are distinct from the controller unit. The controller unit appears as a peer PCIe device to the one or more data storage devices. The DRAM pool is shared by the one or more data storage devices. The one or more data storage devices is two or more data storage devices. Each data storage device of the one or more data storage devices includes a first port and a second port. The first port is coupled to the PCIe switch.

In another embodiment, a storage system includes a first data storage device, a second data storage device, a PCIe switch coupled to the first data storage device and the second data storage device, and a controller unit coupled to the first data storage device and the second data storage device. The controller unit includes a dynamic random access memory (DRAM) host memory buffer (HMB) controller and a DRAM pool. The DRAM pool includes one or more DRAM devices.

The first data storage device and the second data storage device each have a first port and a second port. The first port is coupled to the PCIe switch. The second port is coupled to the controller unit. The second port is coupled to a HMB controller. The HMB controller is disposed in the first data storage device and the second data storage device. The second port is coupled to the DRAM HMB controller. The controller unit is configured to, upon detecting a power failure event of the controller unit, push data of the DRAM pool to either the first data storage device, the second data storage device, or both first data storage device and the data storage device.

In another embodiment, a storage system includes a first data storage device comprising a first memory means, a second data storage device comprising a second memory means, a PCIe switch coupled to the first data storage device and the second data storage device, and a controller unit coupled to the first data storage device and the second data storage device. The controller unit includes a controller memory buffer (CMB) controller and a root complex/port.

The first data storage device, the second data storage device, and the controller unit each includes a memory means interface, a memory means management unit, and a PCIe/NVMe front end unit. The first data storage device and the second data storage device each includes a first port and a second port. The first port is coupled to the PCIe switch. The second port is coupled to the root complex/port. The CMB controller is coupled to a DRAM pool.

While the foregoing is directed to embodiments of the present disclosure, other and further embodiments of the disclosure may be devised without departing from the basic scope thereof, and the scope thereof is determined by the claims that follow.

What is claimed is:

1. A storage system, comprising:
   one or more data storage devices;
   a PCIe switch coupled to the one or more data storage devices; and
   a controller unit coupled to the PCIe switch, wherein:
      the controller unit is a data storage device; and
      the data storage device is distinct from the one or more data storage devices, the controller unit comprising:
         a dynamic random access memory (DRAM) host memory buffer (HMB) controller for controlling one or more DRAM devices of the controller unit distinct from an HMB of a host device; and
         a DRAM pool, wherein:
            the DRAM pool comprises the one or more DRAM devices disposed in the controller unit; and
            each of the one or more DRAM devices is allocated by the DRAM HMB controller to the one or more data storage devices for use by the one or more data storage devices.

2. The storage system of claim 1, wherein the PCIe switch is directly coupled to the DRAM HMB controller.

3. The storage system of claim 1, wherein each data storage device of the one or more data storage devices comprises:
   a HMB controller;
   a PCIe/NVMe front end unit;
   a memory device management unit;
   a memory device interface unit; and
   a memory device.

4. The storage system of claim 1, wherein the controller unit acts as a root complex for the one or more data storage devices.

5. The storage system of claim 1, wherein the one or more data storage devices are distinct from the controller unit.

6. The storage system of claim 1, wherein the controller unit appears as a peer PCIe device to the one or more data storage devices.

7. The storage system of claim 1, wherein the DRAM pool is shared by the one or more data storage devices.

8. The storage system of claim 1, wherein the one or more data storage devices is two or more data storage devices.

9. The storage system of claim 1, wherein each data storage device of the one or more data storage devices comprises a first port and a second port, and wherein the first port is coupled to the PCIe switch.

10. A storage system, comprising:
    a first data storage device;
    a second data storage device;
    a PCIe switch coupled to the first data storage device and the second data storage device; and
    a controller unit coupled to the first data storage device and the second data storage device, wherein:
       the controller unit is a data storage device; and
       the data storage device is distinct from the first data storage device and the second data storage device, the controller unit comprising:
          a dynamic random access memory (DRAM) host memory buffer (HMB) controller for controlling one or more DRAM devices of the controller unit distinct from an HMB of a host device; and
          a DRAM pool, wherein:
             the DRAM pool comprises the one or more DRAM devices disposed in the controller unit; and
             each of the one or more DRAM devices is allocated by the DRAM HMB controller to the first data storage device and the second data storage device for use by the first data storage device and the second data storage device.

11. The storage system of claim 10, wherein the first data storage device and the second data storage device each have a first port and a second port, and wherein the first port is coupled to the PCIe switch.

12. The storage system of claim 11, wherein the second port is coupled to the controller unit.

13. The storage system of claim 12, wherein the second port is coupled to a HMB controller.

14. The storage system of claim 13, wherein the HMB controller is disposed in the first data storage device and the second data storage device.

15. The storage system of claim 12, wherein the second port is coupled to the DRAM HMB controller.

16. The storage system of claim 10, wherein the controller unit is configured to, upon detecting a power failure event of the controller unit, push data of the DRAM pool to either the first data storage device, the second data storage device, or both first data storage device and the data storage device.

17. A storage system, comprising:
    a first data storage device comprising a first memory means;
    a second data storage device comprising a second memory means;

a PCIe switch coupled to the first data storage device and the second data storage device; and a controller unit coupled to the first data storage device and the second data storage device, wherein:

the controller unit is a data storage device; and the data storage device is distinct from the first data storage device and the second data storage device, the controller unit comprising:

a controller memory buffer (CMB) controller for controlling one or more DRAM devices of the controller unit distinct from an HMB of a host device;

a root complex/port; and a dynamic random access memory (DRAM) pool, wherein:

the DRAM pool comprises the one or more DRAM devices disposed in the controller unit; and each of the one or more DRAM devices is allocated by the CMB controller to the first data storage device and the second data storage device for use by the first data storage device and the second data storage device.

18. The storage system of claim 17, wherein the first data storage device, the second data storage device, and the controller unit each comprises:

a memory means interface;

a memory means management unit; and a PCIe/NVMe front end unit.

19. The storage system of claim 17, wherein the first data storage device and the second data storage device each comprises a first port and a second port, wherein the first port is coupled to the PCIe switch, and wherein the second port is coupled to the root complex/port.

20. The storage system of claim 17, wherein the CMB controller is coupled to the DRAM pool.

* * * * *